L. C. MARSHALL.
PISTON PACKING.
APPLICATION FILED AUG. 25, 1919.
1,360,967.    Patented Nov. 30, 1920.
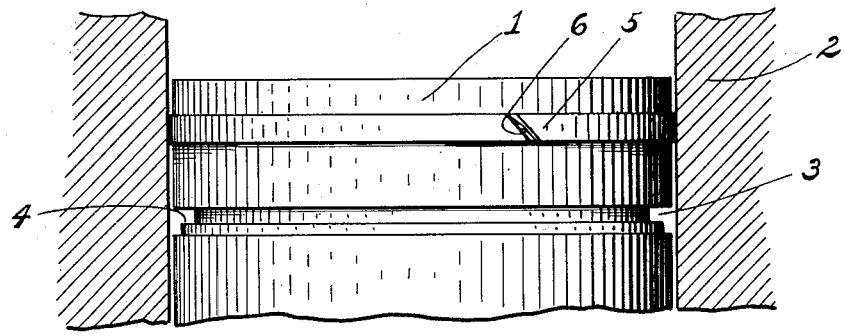
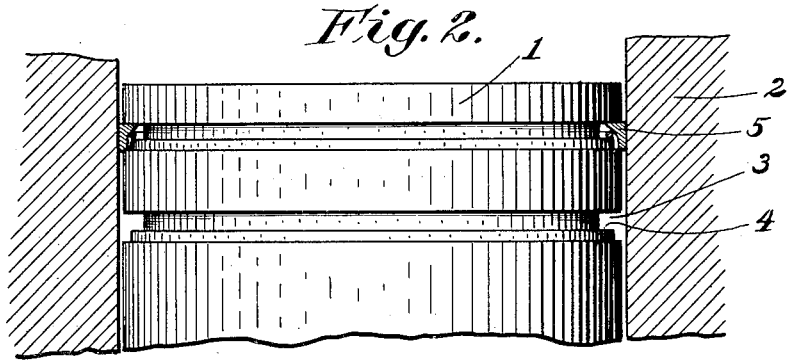
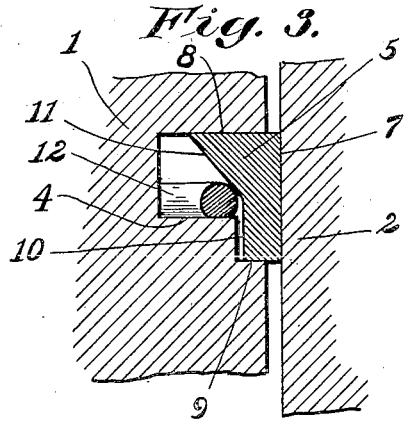
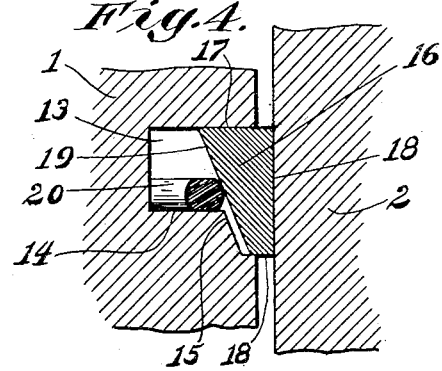
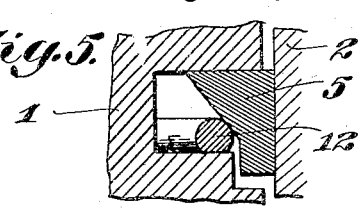
Inventor
Lewis C. Marshall
by Roberts, Roberts & Cushman
his Attorney

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON-PACKING.

1,360,967.   Specification of Letters Patent.   Patented Nov. 30, 1920.

Application filed August 25, 1919. Serial No. 319,750.

*To all whom it may concern:*

Be it known that I, LEWIS C. MARSHALL, a citizen of the United States, and resident of Walpole, in the county of Norfolk and State of Massachusetts, have invented new and useful Improvements in Piston-Packings, of which the following is a specification.

This invention relates to piston packings and while adapted to the packing of pistons generally, it is especially designed for the packing of pistons of internal combustion engines. In such engines in operation the cylinder is cooled while the piston is hot and the latter therefore expands more than the cylinder and must fit loosely within the cylinder to avoid binding. In order to maintain the high compression which is necessary, the piston is provided with packing rings which not only must fit tightly against the cylinder wall, but which must make a tight joint with the groove of the piston within which the rings are disposed to prevent leakage underneath the piston rings.

The principal object of the present invention is to provide a novel and improved metallic piston packing which shall accomplish these results and which shall also be simple in construction and free from multiplicity of parts and complexity of construction.

In the accompanying drawings which illustrate an embodiment of the invention,—

Figure 1 is a side elevation of the packing rings in place on a piston head;

Fig. 2 is a sectional view of said packing rings in place on a piston head;

Fig. 3 is an enlarged detail view in cross-section, illustrating the form of packing rings shown in Figs. 1 and 2;

Fig. 4 is an enlarged detail view in cross-section, illustrating a slight modification of the structure shown in Fig. 3; and Fig. 5 is an enlarged detail view in cross-section, illustrating a further modification.

Referring to the drawings, 1 represents the piston head of an engine which is adapted to reciprocate within the bore of the cylinder 2. The piston-head 1 is provided with L-shaped grooves 3 each of which is provided with a shouldered seat portion 4 formed by cutting a portion of the groove to a greater depth than the remainder of the groove.

Positioned within the grooves of the piston-head are packings each of which comprises a packing ring 5 of gray cast iron or other suitable material and preferably having an external diameter substantially equal to the diameter of the bore of the cylinder 2. The ring 5 is divided at a single point 6 to enable it to be sprung slightly for insertion in the groove 3 and to enable it to be expanded against the cylinder wall, and has substantially the cross-sectional form shown in Fig. 3. The outer peripheral face 7 of the ring is formed substantially at right angles to the parallel upper and lower faces 8 and 9 of the ring, and the inner peripheral face of the ring is formed with a lower portion 10 parallel with the face 7, and an upper portion 11 beveled at an obtuse angle to the lower portion of the face, the angle of bevel being for example 40°. The ring may be of substantially the same width as the wire portion of the groove, or it may be narrower than the groove as shown in Fig. 5. When assembled the thinner part of the ring occupies the shallower part of the groove formed by the seat portion 4.

The spring ring 12 which is preferably flattened on the side which rests on seat 4, is a forcing or follower ring preferably of spring steel, divided at a single point and tending to urge the ring 5 outwardly against the cylinder wall and upwardly against the upper wall of the groove 3. The ring 12 is supported upon the seat portion 4 of the groove in contact with the beveled portion 11 of the inner face of the ring 5 at a point substantially opposite the central region of the ring 5. By so positioning the follower ring 12 that its expansive pressure is directed against the central region of the packing ring 5, the ring 5 is thereby urged evenly against the wall of the cylinder and the wear is evenly distributed on its peripheral surface. Furthermore any tendency of the ring to twist is eliminated and the upper face 8 of the ring is urged with an even bearing against the upper wall of the groove 3.

The rings are assembled in the groove of the piston-head in such position that the points of division of the rings break joint. When assembled in the groove of the piston-head as shown in Figs. 1, 2 and 3, the ring 5 fits against the cylinder wall and is urged into contact therewith by the follower ring 12. The ring 12, coöperating with the beveled surface 11 of the ring 5, by reason of its expansion makes a constant bearing engagement with the surface 11. One component of the force being exerted against the surface 11, tends to expand the ring 5 and thereby effect a tight closure between the periphery of the ring 5 and the cylinder wall, while the other component of said force tends to thrust said packing ring bodily endwise with relation to the piston-head 1 and thereby hold the face 8 of the ring 5 in tight engagement with the upper wall of the groove 3. Thus the packing ring is maintained tight against loss of pressure both between the ring and the cylinder wall and underneath the ring between the ring and the piston-head.

In Fig. 4, I have illustrated a modified form of packing. The piston-head 1 is provided with a groove 13 having a seat 14, the seat 14 being provided with a beveled edge 15. Positioned within the groove 13 is a packing ring 16 substantially trapeziform in cross-section, its parallel faces 17 and 18 resting respectively against the upper and lower walls of the groove and its outer peripheral face 18 adapted to engage the wall of cylinder 2. The inner peripheral face 19 of ring 16 is beveled at an angle to the outer face. The spring follower ring 20, which is preferably flat on one or both sides, is positioned on the seat 14 and exerts an outward expansive thrust against the beveled face 19 of ring 16 at a point which is substantially opposite the central region of said ring.

From the foregoing description it is apparent that I have provided a piston packing comprising but two rings, the rings being held in such positions relative to each other that the packing ring is urged radially and upwardly with no tendency to twist and in consequence presents its packing surfaces squarely against the piston-head and cylinder walls with which they are designed to engage, thereby sealing the piston-head to the cylinder by a gas-tight joint.

I claim:

1. In combination, a piston having an annular groove therein, a portion of said groove being cut deeper than the remainder to form an annular seat, and a packing in said groove comprising a packing ring having a beveled inner face, and a spring follower ring supported within said groove upon said seat in engagement with the beveled face of said packing ring and adapted to urge said packing ring both in a radial direction and in an endwise direction on the piston against the upper wall of said groove.

2. In combination, a piston having an annular groove therein, L-shaped in cross-section to form an annular seat, and a packing in said groove comprising a packing ring having a beveled inner face, and a spring follower ring supported within said groove upon said seat in engagement with the beveled face of said packing ring at a point opposite the central region of said ring and adapted to urge said packing ring both in a radial direction and in an end-wise direction on the piston against the upper wall of said groove.

3. In combination, a piston having an annular groove therein, L-shaped in cross-section to form an annular seat, and a packing in said groove comprising a packing ring having an inner face the upper portion of which is beveled and the lower portion of which is parallel to the outer peripheral face thereof, and a spring follower ring supported within said groove upon said seat and engaging the beveled portion of the inner face of said packing ring and adapted to urge said packing ring both in a radial and in an endwise direction on the piston against the upper wall of said groove.

4. In combination, a piston having an annular groove therein, a portion of said groove being cut deeper than the remainder to form an annular seat, and a packing in said groove comprising a packing ring made thicker at the side occupying the deeper part of the groove than at the side occupying the shallower part of the groove, the thicker part at least of the ring having a beveled inner face, and a spring follower ring supported within said groove upon said seat in engagement with the beveled face of the thicker part of the packing ring.

Signed by me at Boston, Massachusetts this 2d day of August, 1919.

LEWIS C. MARSHALL.